(12) United States Patent
Yamato et al.

(10) Patent No.: US 9,970,358 B2
(45) Date of Patent: May 15, 2018

(54) EXHAUST FLUE

(71) Applicant: MITSUBISHI HEAVY INDUSTRIES, LTD., Tokyo (JP)

(72) Inventors: Tei Yamato, Tokyo (JP); Yoshifumi Masuda, Tokyo (JP); Toyosei Aota, Tokyo (JP); Kazufumi Ikeda, Tokyo (JP); Takanori Ito, Tokyo (JP); Tomonori Toda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 342 days.

(21) Appl. No.: 14/768,868

(22) PCT Filed: Sep. 9, 2013

(86) PCT No.: PCT/JP2013/074262
§ 371 (c)(1),
(2) Date: Aug. 19, 2015

(87) PCT Pub. No.: WO2014/141509
PCT Pub. Date: Sep. 18, 2014

(65) Prior Publication Data
US 2015/0377139 A1    Dec. 31, 2015

(30) Foreign Application Priority Data
Mar. 12, 2013  (JP) .............................. 2013-049576

(51) Int. Cl.
F02C 7/24 (2006.01)
F01D 25/30 (2006.01)
F23R 3/00 (2006.01)

(52) U.S. Cl.
CPC ............... *F02C 7/24* (2013.01); *F01D 25/30* (2013.01); *F23R 3/002* (2013.01);
(Continued)

(58) Field of Classification Search
CPC ............... F23J 2213/40; F23J 2213/50; F23J 2900/13003; F02C 7/24; F01D 25/30
(Continued)

(56) References Cited

U.S. PATENT DOCUMENTS 2,869,671 A * 1/1959 Schlachter ................ F01N 1/00
181/222
3,159,238 A * 12/1964 Shearer ..................... B64F 1/26
181/213
(Continued)

FOREIGN PATENT DOCUMENTS

| CN | 1215795 | 5/1999 |
| CN | 1551965 | 12/2004 |

(Continued)

OTHER PUBLICATIONS

Notice of Allowance dated Nov. 30, 2016 in corresponding Korean Application No. 10-2015-7023213, with English translation.
(Continued)

*Primary Examiner* — Jeremy Luks
(74) *Attorney, Agent, or Firm* — Wenderoth, Lind & Ponack, L.L.P.

(57) ABSTRACT

An exhaust flue includes an exhaust chimney body, and an open end multi-hole area. The exhaust chimney body defines a passage for discharging exhaust gas. The open end multi-hole area is an area in which multiple holes are defined around a total circumference of an open end of the exhaust chimney body.

10 Claims, 16 Drawing Sheets

(52) U.S. Cl.
CPC ....... *F05D 2260/94* (2013.01); *F23J 2213/50* (2013.01); *F23J 2900/13003* (2013.01)

(58) Field of Classification Search
USPC .......................................... 181/213, 218, 224
See application file for complete search history.

(56) References Cited

U.S. PATENT DOCUMENTS

| | | | | |
|---|---|---|---|---|
| 3,187,835 | A * | 6/1965 | Smith | B64F 1/26 |
| | | | | 181/217 |
| 3,196,977 | A * | 7/1965 | Sanders | F01N 1/10 |
| | | | | 181/256 |
| 3,688,865 | A * | 9/1972 | Cloyd | B64F 1/26 |
| | | | | 181/218 |
| 3,894,610 | A * | 7/1975 | Halter | F01N 1/10 |
| | | | | 181/256 |
| 4,180,141 | A | 12/1979 | Judd | |
| 4,862,993 | A * | 9/1989 | Rieger | F01N 1/24 |
| | | | | 126/500 |
| 5,837,890 | A * | 11/1998 | Long | F01D 25/30 |
| | | | | 181/184 |
| 5,960,787 | A * | 10/1999 | Raleigh | F23J 11/00 |
| | | | | 110/162 |
| 6,161,646 | A * | 12/2000 | Curl | F01D 25/30 |
| | | | | 181/238 |
| 7,707,818 | B2 * | 5/2010 | Venkataraman et al. | F01D 25/30 |
| | | | | 181/213 |
| 8,240,427 | B2 * | 8/2012 | Jangili | F01D 25/30 |
| | | | | 181/222 |
| 2002/0011065 | A1 | 1/2002 | Nishimura et al. | |
| 2003/0136101 | A1 | 7/2003 | Nishimura et al. | |
| 2005/0188673 | A1 | 9/2005 | Nishimura et al. | |
| 2011/0318697 | A1 * | 12/2011 | Yokohama | F23G 7/085 |
| | | | | 431/202 |

FOREIGN PATENT DOCUMENTS

| | | | | |
|---|---|---|---|---|
| CN | 102518499 | | 6/2012 | |
| FR | 2589195 | A1 * | 4/1987 | F01N 1/10 |
| JP | 51-21409 | | 6/1976 | |
| JP | 52-49004 | | 11/1977 | |
| JP | 62-132722 | | 8/1987 | |
| JP | 1-273909 | | 11/1989 | |
| JP | 3-38543 | | 4/1991 | |
| JP | 4-3240 | | 1/1992 | |
| JP | 5-321482 | | 12/1993 | |
| JP | 8-7232 | | 3/1996 | |
| JP | 9-112244 | | 4/1997 | |
| JP | 10-205169 | | 8/1998 | |
| JP | 10-325533 | | 12/1998 | |
| JP | 11-159347 | | 6/1999 | |
| JP | 2000-314512 | | 11/2000 | |
| JP | 2001-90522 | | 4/2001 | |
| JP | 3325991 | | 7/2002 | |
| JP | 2003-120025 | | 4/2003 | |
| JP | 2004-94065 | | 3/2004 | |
| JP | 2009-198092 | | 9/2009 | |
| JP | 2010-127246 | | 6/2010 | |

OTHER PUBLICATIONS

Decision of a Patent Grant dated Nov. 29, 2016 in corresponding Japanese Application No. 2013-049576, with English translation.
First Office Action dated Mar. 28, 2016 in corresponding Chinese Application No. 201380073956.8 (with English Translation).
International Search Report dated Dec. 10, 2013 in International (PCT) Application No. PCT/JP2013/074262.
Notice of Grounds for Rejection dated Jul. 1, 2016 in corresponding Korean Application No. 10-2015-7023213 (with English translation).
Office Action dated Nov. 30, 2016 in corresponding Chinese Application No. 201380073956.8, with English translation.
Written Opinion of the International Searching Authority dated Dec. 10, 2013 in International (PCT) Application No. PCT/JP2013/074262, with English translation.
Office Action dated Oct. 4, 2016 in Japanese Application No. 2013-049576, with English translation.

* cited by examiner

EXHAUST FLUE

TECHNICAL FIELD

The present invention relates to an exhaust flue for discharging exhaust gas from, for example, a gas turbine.

BACKGROUND ART

A typical gas turbine is made up of a compressor, a combustor, and a turbine. Air taken in through an air duct is compressed by the compressor to produce high-temperature, high-pressure compressed air, to which fuel is supplied and the two are combusted in the combustor to obtain high-temperature, high-pressure combustion gas (operating fluid), which is used to drive the turbine, thereby driving a power generator coupled to the turbine.

Such exhaust flues for discharging exhaust gas from gas turbines of this sort may emit low-frequency component noise of a few Hz or less to the outside as the result of resonance in the acoustic field within the gas turbine. Because low-frequency component noise is often at or below the frequencies audible to humans, for example, such noise is rarely directly perceived, but it can indirectly cause rattling in windows and the like in buildings around the plant.

Silencers are one technology used to reduce the possibility of specific low-frequency component noise of this sort from being released to the outside (see Japanese Unexamined Patent Application Publication No. H11-159347A).

Technical Problem

The exhaust flue silencer of Japanese Unexamined Patent Application Publication No. H11-159347A is capable of reducing low-frequency component noise. However, in the exhaust flue disclosed in Japanese Unexamined Patent Application Publication No. H11-159347A, the size of the silencer must be increased in order to reduce resonant vibration in acoustic fields of low frequencies at or below audible levels, thereby necessitating increased time and expense to install the silencer.

SUMMARY OF INVENTION

The present invention is intended to solve the problem described above, and has an object of providing an exhaust flue in which the emission of low-frequency component noise to the outside is suppressed by means of a simple arrangement.

Solution To Problem

In order to achieve to the object described above, the exhaust flue comprises an exhaust chimney body constituting a passage for discharging exhaust gas, and an open end multi-hole area in which a plurality of holes is formed around a total circumference of an open end of the exhaust chimney body.

This arrangement allows reflection of resonant vibration within the exhaust chimney body to be suppressed. As a result, the increased amplification caused by resonant vibration in the exhaust flue is reduced, thereby suppressing the emission of low-frequency component noise from the open end. This enables the exhaust flue to reduce the possibility of indirectly producing vibration in windows and the like of buildings around the plant.

The arrangement described above only requires that a plurality of holes be formed in the exhaust flue around the total circumference of the open end of the exhaust chimney body, allowing for shorter installation time and reduced installation cost.

In the present invention, it is preferable that another multi-hole area in which a plurality of holes is formed be provided on the exhaust chimney body at a position different from that of the open end multi-hole area.

Such an arrangement allows the other multi-hole area to suppress the reflection of acoustic-mode resonant vibration of higher harmonic components. As a result, the reflection of acoustic-mode resonant vibration of higher harmonic components within the exhaust chimney body can be suppressed. As a result, the increased amplification caused by resonant vibration in the exhaust flue is reduced, thereby suppressing the emission of low-frequency component noise from the open end.

In the present invention, an outer sheath that covers an outer periphery of the open end multi-hole area with a gap therebetween is preferably provided.

Such an arrangement forms a layer of air present in the gap, increasing acoustic impedance at the open end. As a result, the increased amplification caused by resonant vibration in the exhaust flue is reduced, thereby suppressing the emission of low-frequency component noise from the open end.

In the present invention, the exhaust chimney body is preferably provided with reinforcing ribs between adjacent holes in the open end multi-hole area, or between adjacent holes in the other multi-hole area.

Such an arrangement allows the exhaust flue to suppress the reflection of resonant vibration within the exhaust chimney body, and allows the exhaust chimney body to maintain at least a certain level of strength.

In the present invention, the exhaust chimney body preferably comprises an outer wall, an inner wall, a linking member configured to link the outer wall and the inner wall, and thermal insulation disposed between the outer wall and the inner wall, the holes being formed through the outer wall, the thermal insulation, and the inner wall.

Such an arrangement inhibits the transfer of heat from the exhaust gas to the outer wall, allowing for increased lifespan.

In the present invention, the holes are preferably constituted by cylindrical members that pass through the outer wall, the thermal insulation, and the inner wall.

In this arrangement, holes are formed by the cylindrical members, allowing for a simplified structure, and the infiltration of exhaust gas between the outer wall and the inner wall is prevented, thereby allowing for improved durability.

In the present invention, upper and lower ends of the gap provided between the open end multi-hole area and the outer sheath preferably open to the outside.

In this arrangement, exhaust gas discharged from the exhaust chimney body through the holes into the gap mixes with and is cooled by outside air entering from the lower end of the gap. The cooled exhaust gas then rises through the gap and is discharged out the upper end, allowing for the suppression of increases in the temperature of the outer wall.

In the present invention, thermal insulation is preferably provided on an inner surface of the outer sheath facing the holes.

In this arrangement, exhaust gas discharged from the exhaust chimney body through the holes into the gap collides with the thermal insulation and rises upward, thereby allowing for the suppression of increases in the temperature of the outer wall.

In the present invention, ribs are preferably provided on an outer surface of the outer sheath.

In this arrangement, the shape or dimensions of the ribs can be adjusted to yield optimal acoustic impedance at the open end.

In the present invention, a plurality of tubular multi-hole structure blocks of predetermined lengths is preferably linked together.

In this arrangement, a plurality of multi-hole structure blocks can be manufactured, for example, at a factory and transported to a site, where the plurality of multi-hole structure blocks is linked together to create an exhaust flue, thereby allowing the manufacturing process to be simplified and construction costs to be reduced.

An exhaust flue comprising an exhaust chimney body constituting a passage for discharging exhaust gas, and an open end multi-hole area in which a plurality of holes is formed around at least a portion of a total circumference of an open end of the exhaust chimney body.

This arrangement allows for suppressed reflection of resonant vibration within the exhaust chimney body. As a result, the increased amplification caused by resonant vibration in the exhaust flue is reduced, thereby suppressing the emission of low-frequency component noise from the open end. This enables the exhaust flue to reduce the possibility of indirectly producing vibration in windows and the like of buildings around the plant.

In the present invention, the open end multi-hole area is preferably provided at the open end of the exhaust chimney body on an inner side thereof with respect to the direction in which the exhaust chimney body bends.

Such an arrangement allows the amount of exhaust gas discharged from the open end multi-hole area to be reduced.

Advantageous Effects of Invention

In accordance with the present invention, an exhaust flue can be provided in which the emission of low-frequency component noise to the outside is suppressed by means of a simple arrangement.

DESCRIPTION OF EMBODIMENTS

Embodiments of the present invention will now be described in details with reference to the drawings. However, the present invention is not limited by these embodiments, and, when there is a plurality of embodiments, encompasses combinations of these various embodiments. The constituent elements described hereafter encompass elements that would be readily contemplated by a person skilled in the art or are substantially identical thereto. The various constituent elements described hereafter may also be combined, as appropriate.

First Embodiment

Figure 1:
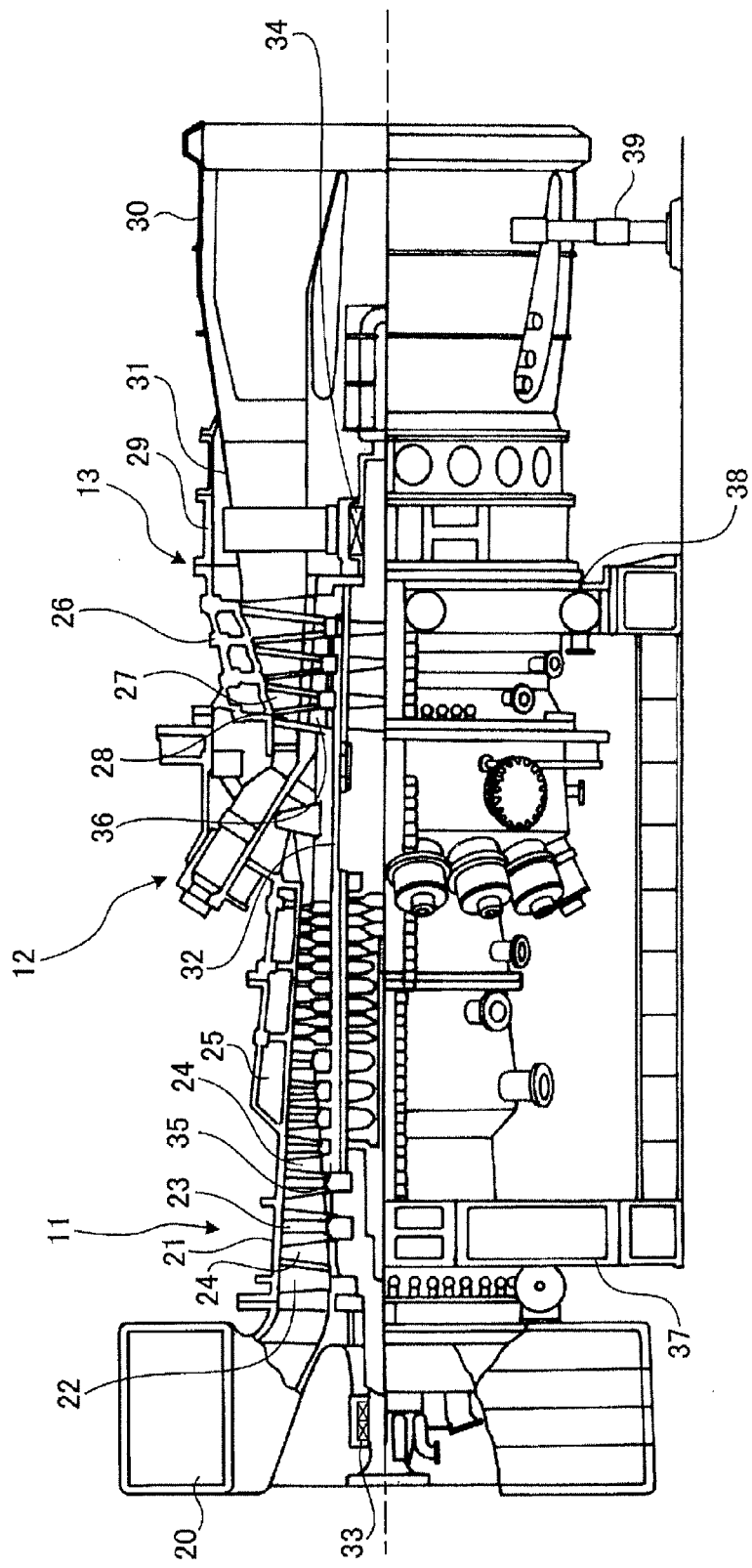
FIG. 1 is a schematic view of the configuration of a gas turbine according to a first embodiment.

FIG. 1 is a schematic view of the configuration of a gas turbine according to a first embodiment. As illustrated in FIG. 1, a gas turbine comprises a compressor 11, a combustor 12, and a turbine 13. The gas turbine is coupled to a power generator not illustrated in the drawings, and is capable of generating power.

The compressor 11 comprises an air intake duct 20 for taking in air, inlet guide vanes (IGVs) 22 are provided and a plurality of stator vanes 23 and rotating blades 24 is provided in alternation with respect to the forward/backward direction (the axial direction of a rotor 32, to be described hereafter) within a compressor housing 21, and an air discharge chamber 25 is provided on the outside of the housing 21. The combustor 12 supplies fuel to compressed air compressed by the compressor 11, and ignites the mixture to allow for combustion. The turbine 13 comprises a plurality of stator vanes 27 and rotating blades 28 provided in alternation with respect to the forward/backward direction (the axial direction of the rotor 32, to be described hereafter) within a turbine housing 26. An exhaust chamber 30 is disposed downstream of the turbine housing 26 with an exhaust housing 29 disposed therebetween, and the exhaust chamber 30 comprises an exhaust diffuser 31 connected to the turbine 13.

A rotor (main shaft) 32 is positioned so as to pass through the centers of the compressor 11, the combustor 12, the turbine 13, and the exhaust chamber 30. The end of the rotor 32 by the compressor 11 is rotatably supported by a shaft bearing 33, and the end thereof by the exhaust chamber 30 is rotatably supported by a shaft bearing 34. A plurality of rotor discs 35 on which the rotating blades 24 are mounted is anchored in layers to the rotor 32 in the compressor 11, a plurality of rotor discs 36 on which the rotating blades 28 are mounted is anchored in layers thereto in the turbine 13, and the end of the rotor 32 by the exhaust chamber 30 is connected to a drive shaft of a power generator not illustrated in the drawings.

The gas turbine is supported by a leg 37 under the compressor housing 21 of the compressor 11, by a leg 38 under the turbine housing 26 of the turbine 13, and by a leg 39 under the exhaust chamber 30.

Accordingly, air taken in through the air intake duct 20 of the compressor 11 passes through the inlet guide vanes 22 and the plurality of stator vanes 23 and rotating blades 24 and is compressed, thereby converting the air to high-temperature, high-pressure compressed air. A predetermined fuel is supplied to the compressed air in the combustor 12, and combusted. High-temperature, high-pressure combustion gas produced by the combustor 12 passes through the plurality of stator vanes 27 and rotating blades 28 making up the turbine 13, thereby driving the rotation of the rotor 32 and, in turn, driving the power generator (not illustrated) connected to the rotor 32. Meanwhile, energy from the exhaust gas (combustion gas) is converted to pressure by the exhaust diffuser 31 of the exhaust chamber 30 and decelerated, then sent to an exhaust flue, to be described hereafter.

Figure 2:
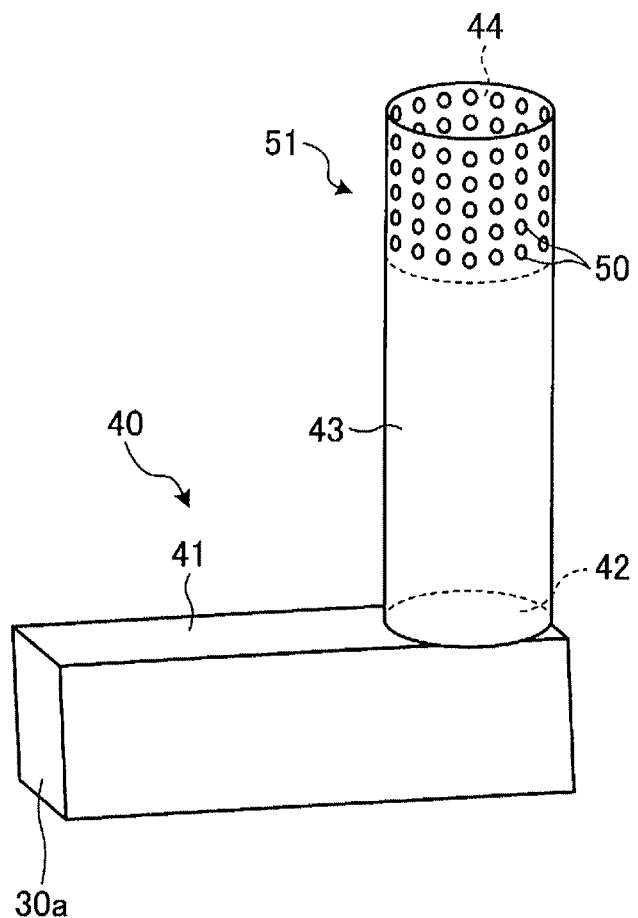
FIG. 2 is a schematic perspective view of an exhaust flue according to the first embodiment.
Figure 3:
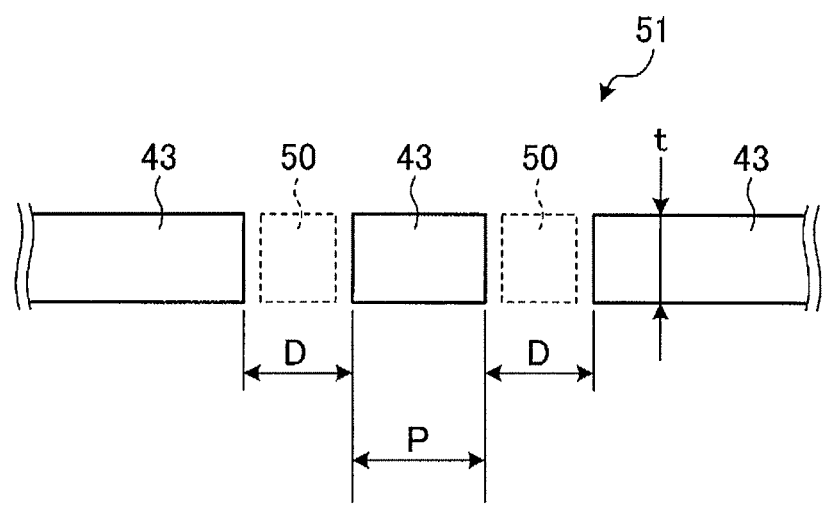
FIG. 3 is a partial schematic cross-sectional view of an open end multi-hole area as viewed along a plane passing through the centers of the holes in FIG. 2.
Figure 4:
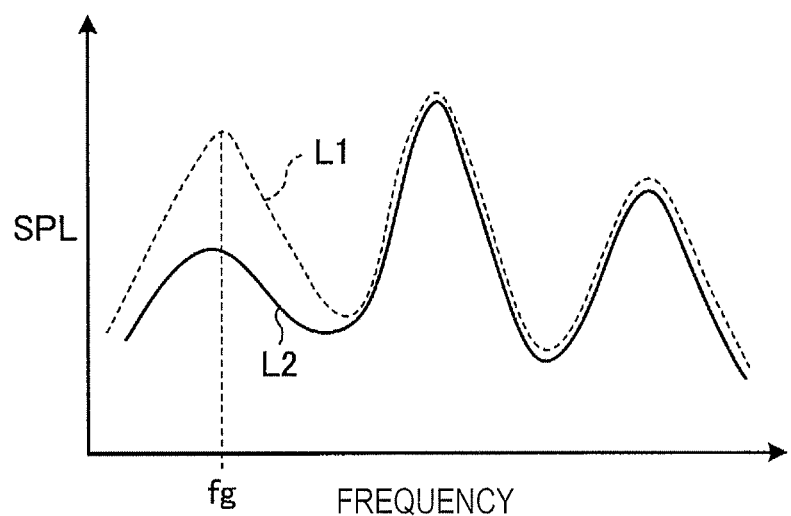
FIG. 4 is a diagram for explaining the sound pressure level of low-frequency components emitted by the exhaust flue according to the first embodiment.

FIG. 2 is a schematic perspective view of the exhaust flue according to the first embodiment. FIG. 3 is a partial schematic cross-sectional view of an open end multi-hole area as viewed along a plane passing through the centers of the holes in FIG. 2. FIG. 4 is a diagram for explaining the sound pressure level of low-frequency components emitted by the exhaust flue according to the first embodiment. As illustrated in FIG. 2, an exhaust flue 40 according to the first embodiment comprises an exhaust duct body 41 and an exhaust chimney body 43.

The exhaust duct body 41 has a predetermined length, is formed from sheet metal bent into a predetermined shape, has a connection opening 30a that communicates with the exhaust chamber 30 at one end, and communicates with the exhaust chimney body 43 via a communication hole 42 at the other end. The exhaust chimney body 43 is formed from metal rolled into a tubular shape. Exhaust gas in the exhaust chamber 30 is taken into the exhaust flue 40 via the connection opening 30a, passes in order through the exhaust duct body 41, the communication hole 42, and the exhaust chimney body 43, and is discharged to the atmosphere through an open end 44 of the exhaust chimney body 43.

As described above, pressure pulses and exhaust gas turbulence generated by the combustor 12 illustrated in FIG. 1 may be amplified by the resonant vibration of the exhaust flue 40, causing low-frequency component noise at or below audible levels to be emitted from the open end 44 of the exhaust chimney body 43. The low-frequency component noise is, for example, in the lower double digits of Hz or less (for example, from 1 Hz to 20 Hz). Because this low-frequency component noise is often at or below the frequencies audible to humans, such noise is rarely directly perceived, but it can indirectly cause vibration (rattling) in windows and the like in buildings around the plant.

As illustrated in FIG. 2, the exhaust flue 40 of the first embodiment is provided with the open end multi-hole area 51 in which a plurality of holes 50 is formed around the total circumference of the open end 44 of the exhaust chimney body 43. The open end multi-hole area 51 can be formed simply by forming the plurality of holes 50 around the total circumference of the open end 44 of the exhaust chimney body 43, allowing for shorter installation time and reduced installation cost.

Low-frequency component noise is amplified by resonant vibration in the exhaust flue 40, and the resonant vibration is reflected at the open end 44. The holes 50 in the open end 44 act as acoustic resistors that increase acoustic impedance at the open end 44. This results in a reduction in the amplification by which pressure pulses and exhaust gas turbulence generated by the combustor 12 are amplified by the resonant vibration of the exhaust flue 40, thereby suppressing low-frequency component noise emitted from the open end 44.

As illustrated in FIG. 3, the holes 50 in the open end multi-hole area 51 are formed as appropriate based on the thickness t of the exhaust chimney body 43, the diameter D of the holes 50, the spacing P between the holes 50, and the number of holes 50 in the open end multi-hole area 51 so that the sound pressure level (SPL; unit: dB) of the low-frequency component noise emitted by the open end 44 is at or below a target value.

For example, defining the horizontal axis as frequency and the vertical axis as sound pressure level (SPL), as illustrated in FIG. 4, a sound pressure level curve 82 representing a case in which the open end multi-hole area 51 with the holes 50 is present is calculated based on the thickness t of the exhaust chimney body 43, the diameter D of the holes 50, the spacing P between the holes 50, and the number of holes 50 in the open end multi-hole area 51. The diameter D of the holes 50, the spacing P between the holes 50, and the number of holes 50 in the open end multi-hole area 51 in the exhaust chimney body 43 of the exhaust flue 40 according to the first embodiment, as illustrated in FIG. 3, are set so that the SPL of a sound pressure level curve L2 representing a case in which the open end multi-hole area 51 with the holes 50 is present is at a target value at an audible threshold frequency component fg illustrated in FIG. 4 with respect to a sound pressure level curve L1 representing a case in which the open end multi-hole area 51 with the holes 50 are not present.

As described above, the exhaust flue 40 according to the first embodiment comprises the exhaust chimney body 43 and the open end multi-hole area 51. The exhaust chimney body 43 is a passage for discharging exhaust gas. The open end multi-hole area 51 is an area in which the plurality of holes 50 is formed around the total circumference of the open end 44 of the exhaust chimney body 43. This structure allows reflection of resonant vibration within the exhaust chimney body 43 to be suppressed. As a result, the increase in amplification caused by resonant vibration in the exhaust flue 40 is reduced, thereby suppressing the emission of low-frequency component noise from the open end 44. This enables the exhaust flue 40 to reduce the possibility of indirectly producing vibration (rattling) in windows and the like of buildings around the plant. The exhaust flue 40 allows the emission of low-frequency noise to the outside to be suppressed by means of simply forming the holes 50 in the exhaust chimney body 43.

Second Embodiment

Figure 5:
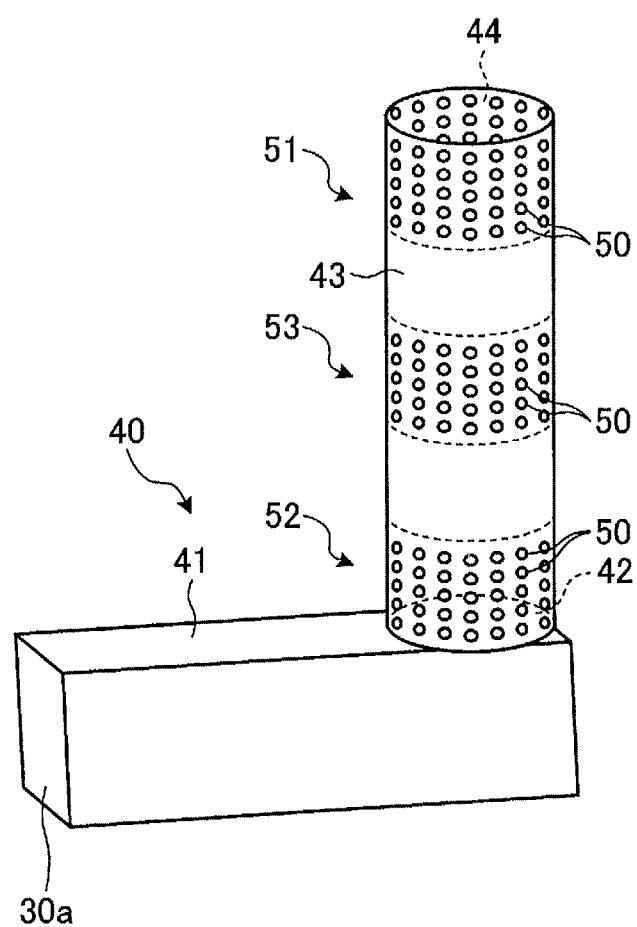
FIG. 5 is a schematic perspective view of an exhaust flue according to a second embodiment.
Figure 6:
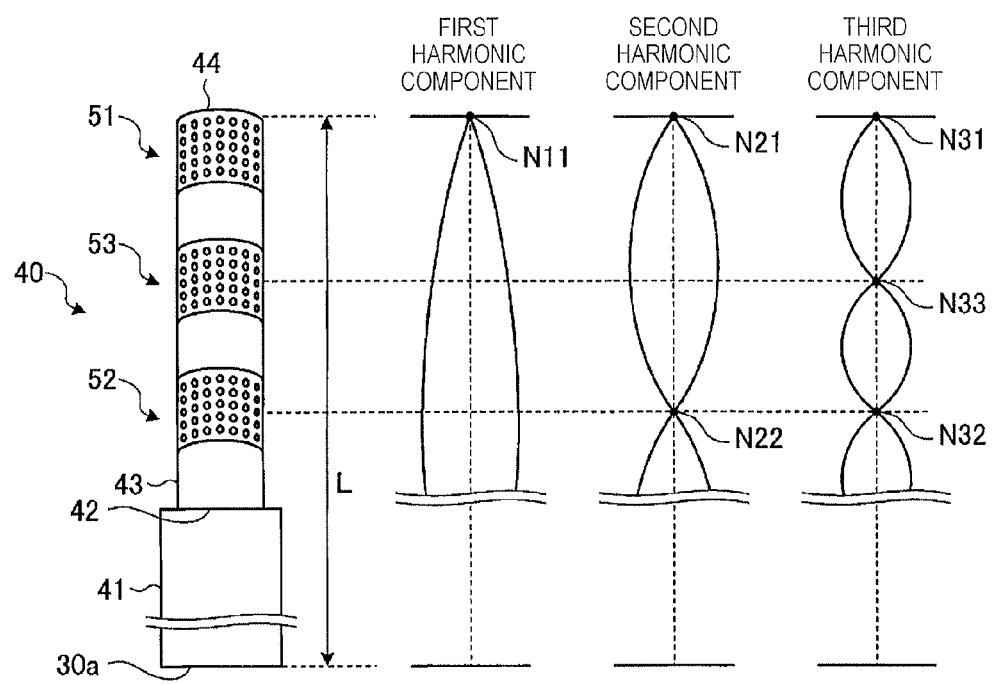
FIG. 6 is a diagram illustrating the positions of multi-hole areas in the second embodiment.

FIG. 5 is a schematic perspective view of an exhaust flue according to a second embodiment. FIG. 6 is a diagram for explaining the positions of multi-hole areas in the second embodiment. In the following description, constituent elements identical to those of the embodiment described above are identically numbered, and redundant description thereof will be omitted.

In an exhaust flue 40 according to the second embodiment, the exhaust chimney body 43 is provided with the open end multi-hole area 51, a second multi-hole area 52, and a third multi-hole area 53. A plurality of holes 50 is formed in the second multi-hole area 52 and the third multi-hole area 53 around the circumference of the exhaust chimney body 43, as in the open end multi-hole area 51. An area in which no holes 50 are formed is present between the open end multi-hole area 51 and the third multi-hole area 53. An area in which no holes 50 are formed is also present between the second multi-hole area 52 and the third multi-hole area 53. In this way, the exhaust flue 40 possesses areas in which no holes 50 are formed, thereby allowing the strength of the exhaust chimney body 43 to be ensured.

The positions at which the second multi-hole area 52 and the third multi-hole area 53 are provided on the exhaust chimney body 43 are at nodes between different acoustic modes of resonant low-frequency component noise. As illustrated in FIG. 6, L is the acoustic length of the exhaust flue 40. The acoustic length L is the length from the connection opening 30a to the open end 44. The acoustic length L is the length of resonant space, and is set according to the facility where the flue is to be installed. The resonance frequency f of the exhaust flue 40 can be expressed by the following formula (1). n=1 represents a first harmonic component, n=2 a second harmonic component, and n=3 a third harmonic component.

[Formula 1]

$$f = \frac{c}{4L} \times (2n-1) \quad (1)$$
$$n = 1, 2, 3$$

For example, in formula (1) illustrated above, c is the speed of sound waves (for example, 340 m/s). c is the product of the resonance frequency f and the wavelength λ, and can therefore be expressed by the following formula (2).

[Formula 2]

$$c = f\lambda \quad (2)$$

The resonance frequency f of formula (1) can be substituted into formula (2) to calculate the wavelength λ according to the following formula (3).

[Formula 3]

$$\lambda = \frac{c}{f} = \frac{4L}{(2n-1)} \quad (3)$$
$$n = 1, 2, 3$$

The second multi-hole area 52 and the third multi-hole area 53 are provided on the exhaust flue 40 at the positions of the nodes of the standing waves of wavelength λ satisfying formula (3). As illustrated in FIG. 6, the position of the node of the first harmonic component waves of wavelength λ is at node N11, which is identical with the position of the open end 44. The positions of the nodes of the second harmonic component waves of wavelength λ are at node N21, which is identical with the position of the open end 44, and node N22. The positions of the nodes of the third harmonic component waves of wavelength λ are at node N31, node N32, and node N33

As described above, the exhaust flue 40 according to the second embodiment comprises the exhaust chimney body 43 and the open end multi-hole area 51. The exhaust flue 40 is also provided with the second multi-hole area 52 and the third multi-hole area 53 constituting other multi-hole areas in which a plurality of holes 50 is formed, the second multi-hole area 52 and the third multi-hole area 53 provided at positions different from that of the open end multi-hole area 51. This structure allows the open end multi-hole area 51 to suppress the reflection of the first harmonic component acoustic mode of resonant vibration within the exhaust chimney body 43.

The second multi-hole area 52 suppresses the reflection of the second harmonic component acoustic mode of resonant vibration within the exhaust chimney body 43. The third multi-hole area 53 suppresses the reflection of the third harmonic component acoustic mode of resonant vibration within the exhaust chimney body 43. The second multi-hole area 52 and the third multi-hole area 53 suppress the reflection of acoustic-mode resonant vibration of higher harmonic components, thereby further reducing the increased amplification caused by the resonant vibration of the exhaust flue 40 and suppressing low-frequency component noise emitted from the open end 44 compared to the exhaust flue 40 of the first embodiment. This enables the exhaust flue 40 to reduce the possibility of indirectly producing vibration (rattling) in windows and the like of buildings around the plant. The second multi-hole area 52 and the third multi-hole area 53 of the exhaust flue 40 can be provided simply by forming holes 50 in the exhaust chimney body 43.

In the exhaust flue 40 according to the second embodiment, the exhaust chimney body 43 is provided with a second multi-hole area 52 and a third multi-hole area 53, but the exhaust chimney body 43 may be provided with only the second multi-hole area 52 or only the third multi-hole area 53. In the exhaust flue 40 according to the second embodiment, n is from 1 to 3 in formulas (1) to (3) illustrated above, but n may also be 4 or greater.

Third Embodiment

Figure 7:
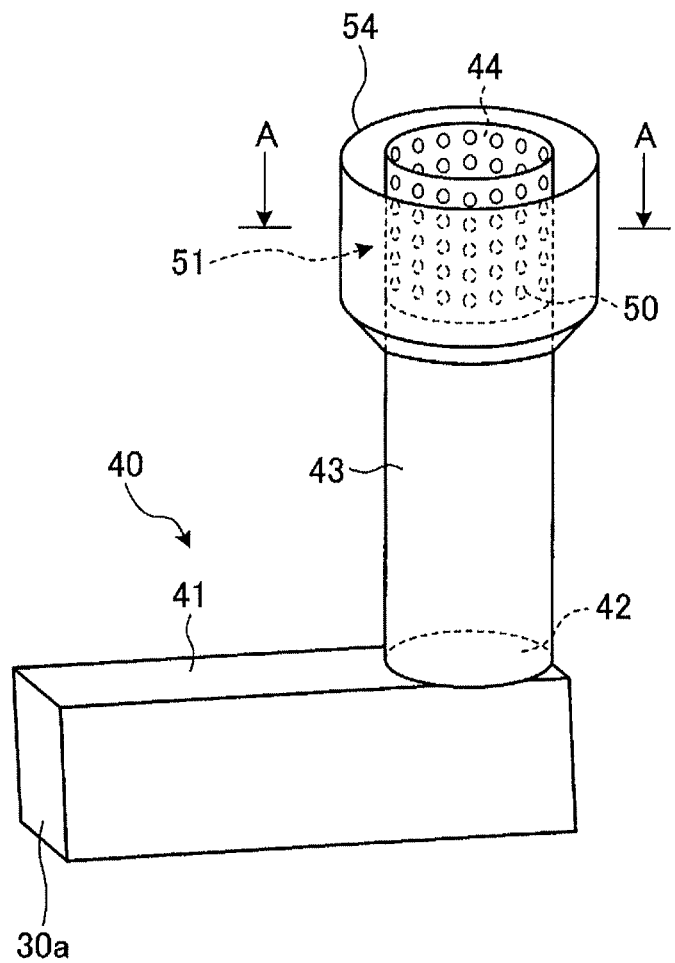
FIG. 7 is a schematic perspective view of an exhaust flue according to a third embodiment.
Figure 8:
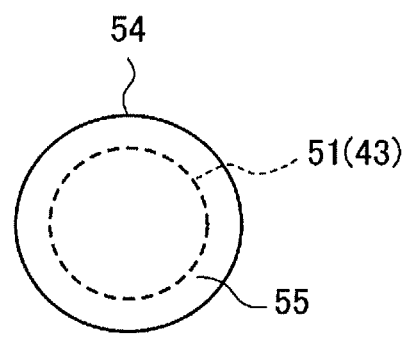
FIG. 8 is a partial cross-sectional view along A-A in FIG. 7.

FIG. 7 is a schematic perspective view of an exhaust flue according to a third embodiment. FIG. 8 is a partial cross-sectional view along A-A in FIG. 7. In the following description, constituent elements identical to those of the embodiments described above are identically numbered, and redundant description thereof will be omitted.

The exhaust chimney body 43 of the exhaust flue 40 according to the third embodiment is provided with the open end multi-hole area 51 and an outer sheath 54 covering the outer circumference of the open end multi-hole area 51 with a gap 55 formed therebetween. As illustrated in FIG. 8, a circular air layer is formed in the gap 55 between the open end multi-hole area 51 and the outer sheath 54.

Low-frequency component noise is amplified by resonant vibration in the exhaust flue 40, and the resonant vibration is reflected at the open end 44. The holes 50 in the open end 44 act as acoustic resistors that increase acoustic impedance at the open end 44. The gap 55 of the present embodiment restricts the movement of sound particles at the outer sheath 54, thereby increasing the acoustic impedance at the open end 44. This results in a reduction in the increased amplification of the pressure pulses and exhaust gas turbulence generated by the combustor 12 by the resonant vibration of the exhaust flue 40, thereby suppressing low-frequency component noise emitted from the open end 44.

Fourth Embodiment

Figure 9:
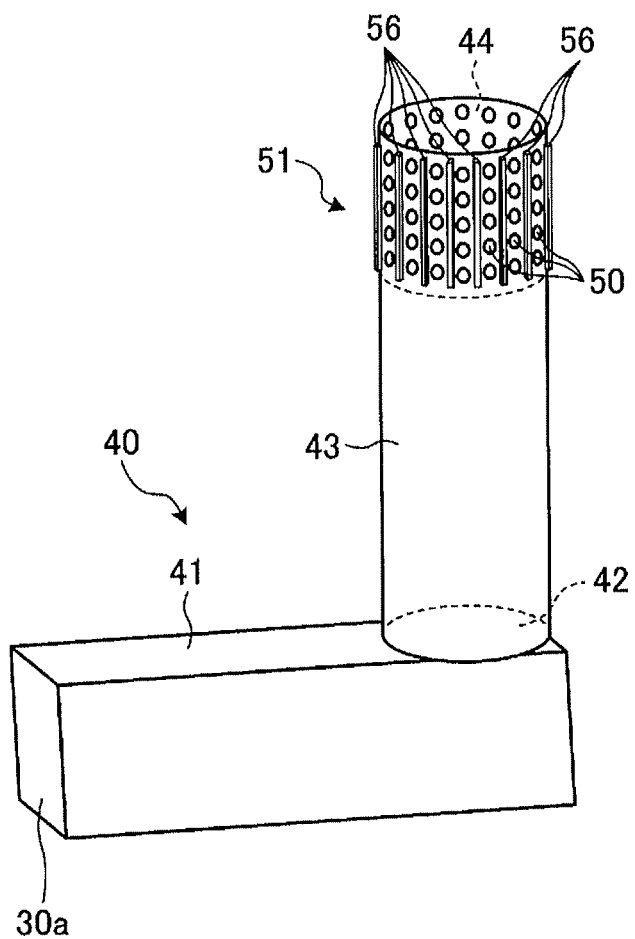
FIG. 9 is a schematic perspective view of an exhaust flue according to the fourth embodiment.

FIG. 9 is a schematic perspective view of an exhaust flue according to the fourth embodiment. In the following description, constituent elements identical to those of the embodiments described above are identically numbered, and redundant description thereof will be omitted.

As illustrated in FIG. 9, reinforcing ribs 56 are formed on the surface of the exhaust chimney body 43 between adjacent holes 50 in the open end multi-hole area 51 of the exhaust flue 40 according to the fourth embodiment. The strength of the exhaust chimney body 43 tends to decrease as the number of holes 50 increases. The reinforcing ribs 56 allow the exhaust chimney body 43 to maintain at least a certain level of strength despite the presence of the holes 50.

In the exhaust flue 40 according to the fourth embodiment, the reinforcing ribs 56 extend vertically along the exhaust chimney body 43, and a plurality of reinforcing ribs 56 is welded or otherwise provided on the surface of the exhaust chimney body 43 at predetermined intervals around the exhaust chimney body 43. The reinforcing ribs 56 may be similarly provided in a second multi-hole area 52 or a third multi-hole area 53 such as those described above in the second embodiment.

As described above, the exhaust chimney body 43 of the exhaust flue 40 according to the fourth embodiment is provided with reinforcing ribs 56 between adjacent holes 50 in the open end multi-hole area 51. The exhaust chimney body 43 of the exhaust flue 40 according to the fourth embodiment may be provided with reinforcing ribs 56 between adjacent holes 50 in a second multi-hole area 52 constituting another multi-hole area as described above, or with reinforcing ribs 56 between adjacent holes 50 in a third multi-hole area 53 constituting another multi-hole area. This structure allows the exhaust flue 40 to suppress the reflection of resonant vibration within the exhaust chimney body 43, and allows the exhaust chimney body 43 to maintain at least a certain level of strength.

Fifth Embodiment

Figure 10:
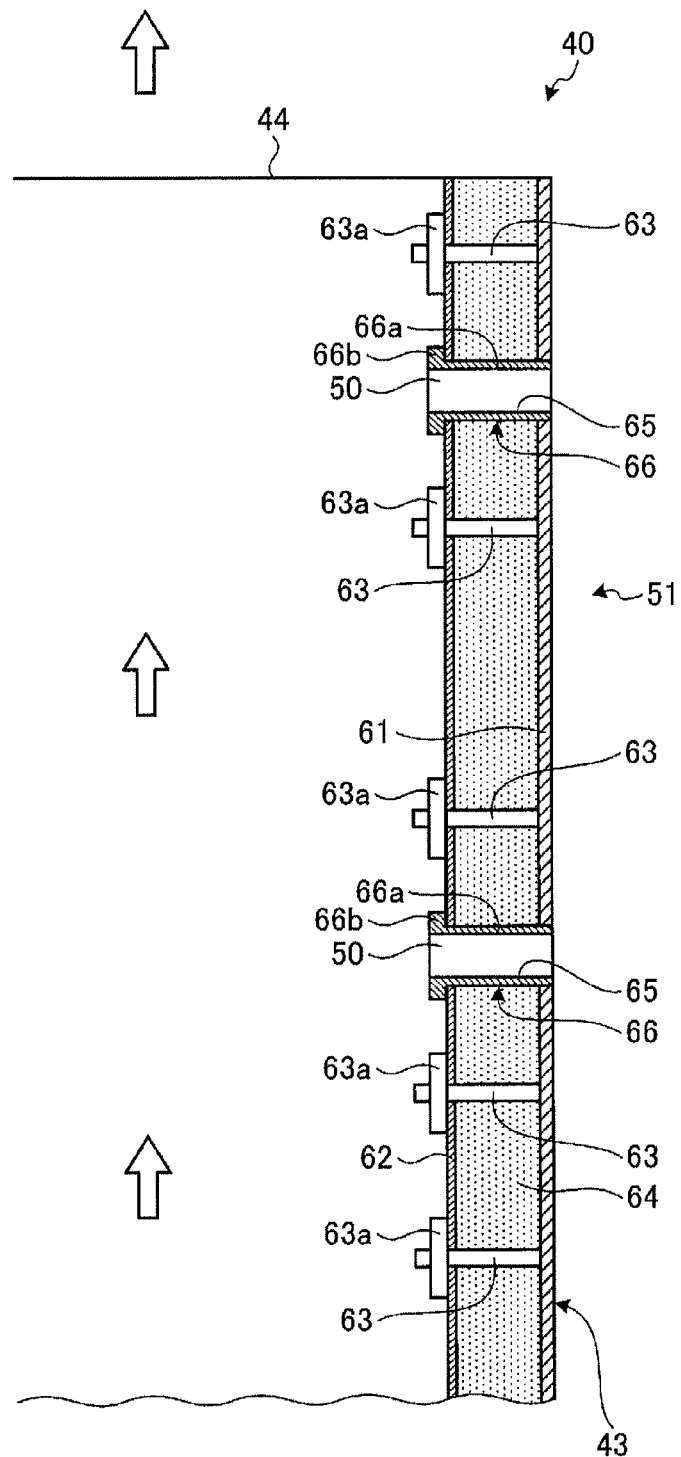
FIG. 10 is a cross-sectional view of the open end of an exhaust flue according to a fifth embodiment.

FIG. 10 is a cross-sectional view of the open end of an exhaust flue according to a fifth embodiment. In the following description, constituent elements identical to those of the embodiment described above are identically numbered, and redundant description thereof will be omitted.

As illustrated in FIG. 10, the exhaust chimney body 43 of the exhaust flue 40 according to the fifth embodiment is constituted by a cylindrically-shaped outer wall 61, an inner wall 62 constituted by a plurality of insulating panels, a plurality of linking members 63 that links the outer wall 61 and the inner wall 62, and thermal insulation 64 disposed between the outer wall 61 and the inner wall 62.

The insulating panels making up the inner wall 62 are of a predetermined size and have a curved shape conforming to the outer wall 61, and the outer edges thereof overlap and are linked to each other to form a cylindrical shape. One end of each of the linking members 63 is anchored to the inner surface of the outer wall 61 via welding, and the other end passes through a section of overlap between insulating panels and has a nut 63a screwed onto the end. The plurality of insulating panels is thus linked together to form the inner wall 62, and the inner wall 62 is linked to the outer wall 61.

The exhaust chimney body 43 is provided with the open end multi-hole area 51 at the open end 44. Through-holes 65 passing through the outer wall 61, the thermal insulation 64, and the inner wall 62 are formed in the open end multi-hole area 51. Cylindrical members 66 are constituted by cylindrical bodies 66a comprising flanges 66b formed integrally at the bases thereof, and are inserted into the through-holes 65 from inside the exhaust chimney body 43. The flanges 66b of the cylindrical members 66 are welded to the inner wall 62, and the ends of the cylindrical members 66 are left free, thereby allowing for the absorption of differences in thermal expansion along the exhaust chimney body 43. Thus, the interiors of the cylindrical members 66 function as the holes 50 in the open end multi-hole area 51. The ends of the cylindrical members 66 and the outer wall 61 may optionally be welded together.

As described above, the exhaust chimney body 43 of the exhaust flue 40 according to the fifth embodiment is constituted by the outer wall 61, the inner wall 62, the linking members 63 linking the two, and the thermal insulation 64 disposed between the outer wall and the inner wall, and the holes 50 are formed passing through the outer wall 61, the thermal insulation 64, and the inner wall 62. In this structure, the thermal insulation 64 in the exhaust flue 40 inhibits the transfer of heat from the exhaust gas to the outer wall 61 thereby discharging degradation of the outer wall 61 and extending the lifespan of the exhaust chimney body 43.

In the exhaust flue 40 according to the fifth embodiment, the holes 50 are formed by the cylindrical members 66 penetrating the inner wall 62, the thermal insulation 64, and the outer wall 61. In this structure, holes 50 can easily be formed in the exhaust flue 40 using the cylindrical members 66, allowing for a simplified structure. The cylindrical members 66 also suppress the infiltration of exhaust gas between the inner wall 62 and the outer wall 61. The flanges 66b of the cylindrical members 66 can be welded to the inner wall 62 to create an exhaust gas seal, thereby reliably discharging the infiltration of exhaust gas into the interior. Durability can thus be improved.

Sixth Embodiment

Figure 11:
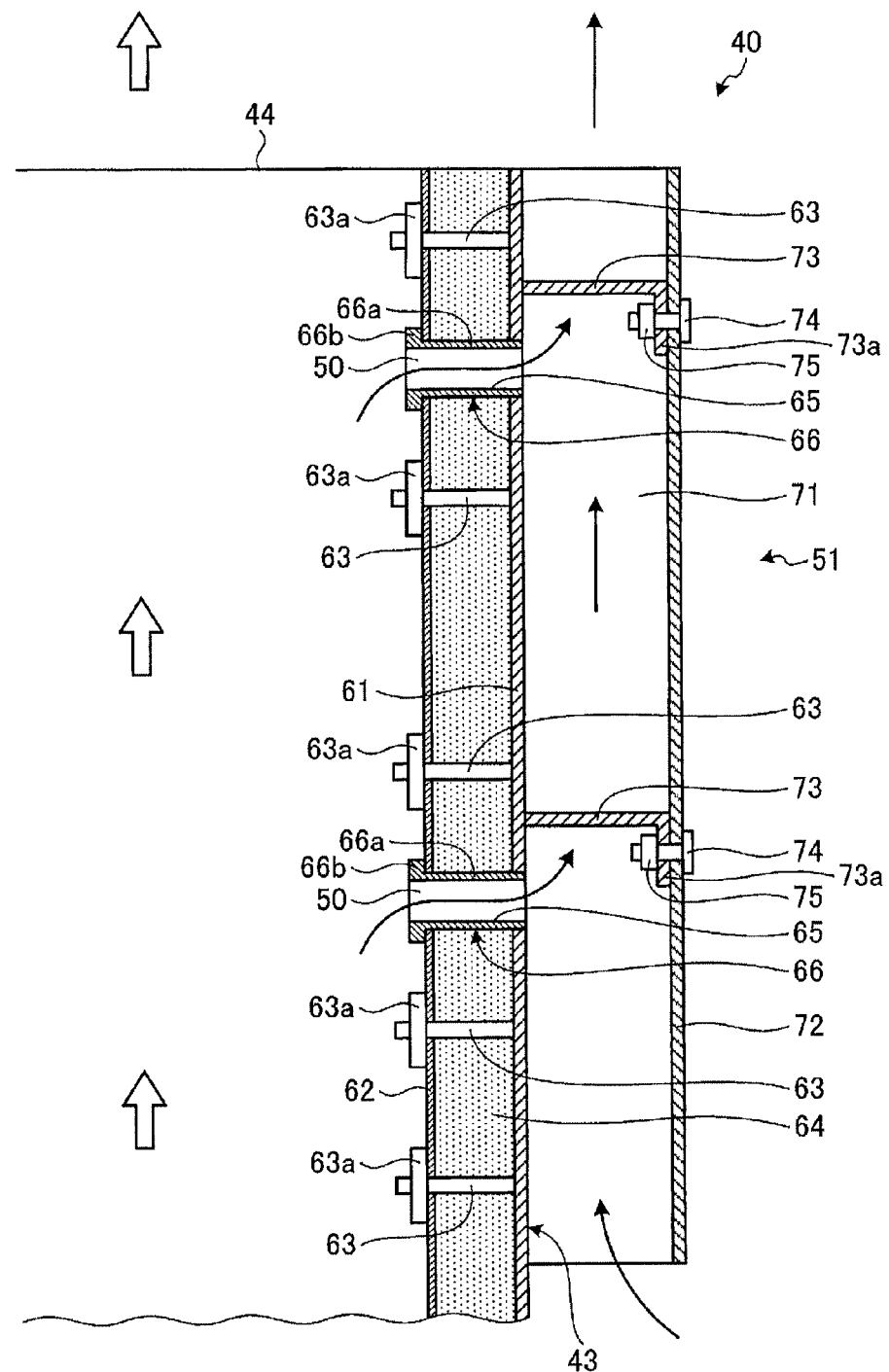
FIG. 11 is a cross-sectional view of the open end of an exhaust flue according to a sixth embodiment.

FIG. 11 is a cross-sectional view of the open end of an exhaust flue according to a sixth embodiment. In the following description, constituent elements identical to those of the embodiment described above are identically numbered, and redundant description thereof will be omitted.

As illustrated in FIG. 11, the exhaust flue 40 according to the sixth embodiment is provided with an outer sheath 72 covering the outer circumference of the open end multi-hole area 51 with a gap 71 formed therebetween. The gap 71 is provided between the outside of the open end multi-hole area 51 of the exhaust chimney body 43 and the inside of the outer sheath 72, and forms a ring-shaped air layer having open upper and lower ends.

The outer sheath 72 is imparted with a greater diameter than the exhaust chimney body 43 (open end multi-hole area 51), and is supported on the exhaust chimney body 43 by a plurality of supporting members 73. One end of each of the supporting members 73 is welded to the outer surface of the exhaust chimney body 43 (open end multi-hole area 51), and bent sections 73a on the other ends thereof are welded to the inner surface of the outer sheath 72, and fastened in place by bolts 74 and nuts 75.

Some of the high-temperature exhaust gas rising through the open end multi-hole area 51 of the exhaust chimney body 43 passes through the holes 50 and is discharged into the gap 71, and then rises through the gap 71. Meanwhile, outside air is taken in from the lower end of the gap 71 and mixes with the rising exhaust gas. Having been cooled by the outside air, the exhaust gas is discharged out the upper end of the gap 71.

As described above, the exhaust flue 40 according to the sixth embodiment is provided with the outer sheath 72 that covers the outer circumference of the open end multi-hole area 51 of the exhaust chimney body 43 with a gap 71 formed therebetween, and the upper and lower ends of the gap 71 open to the outside. This structure causes exhaust gas passing through the holes 50 in the open end multi-hole area 51 into the gap 71 to mixed with and be cooled by outside air taken in from the lower end of the gap 71. The cooled exhaust gas then rises through the gap 71 and is discharged out the upper end, allowing for the suppression of increases in the temperature of the outer wall 61. In addition, the exterior of the open end multi-hole area 51 (holes 50) is covered by the outer sheath 72, allowing for improved appearance.

Seventh Embodiment

Figure 12:
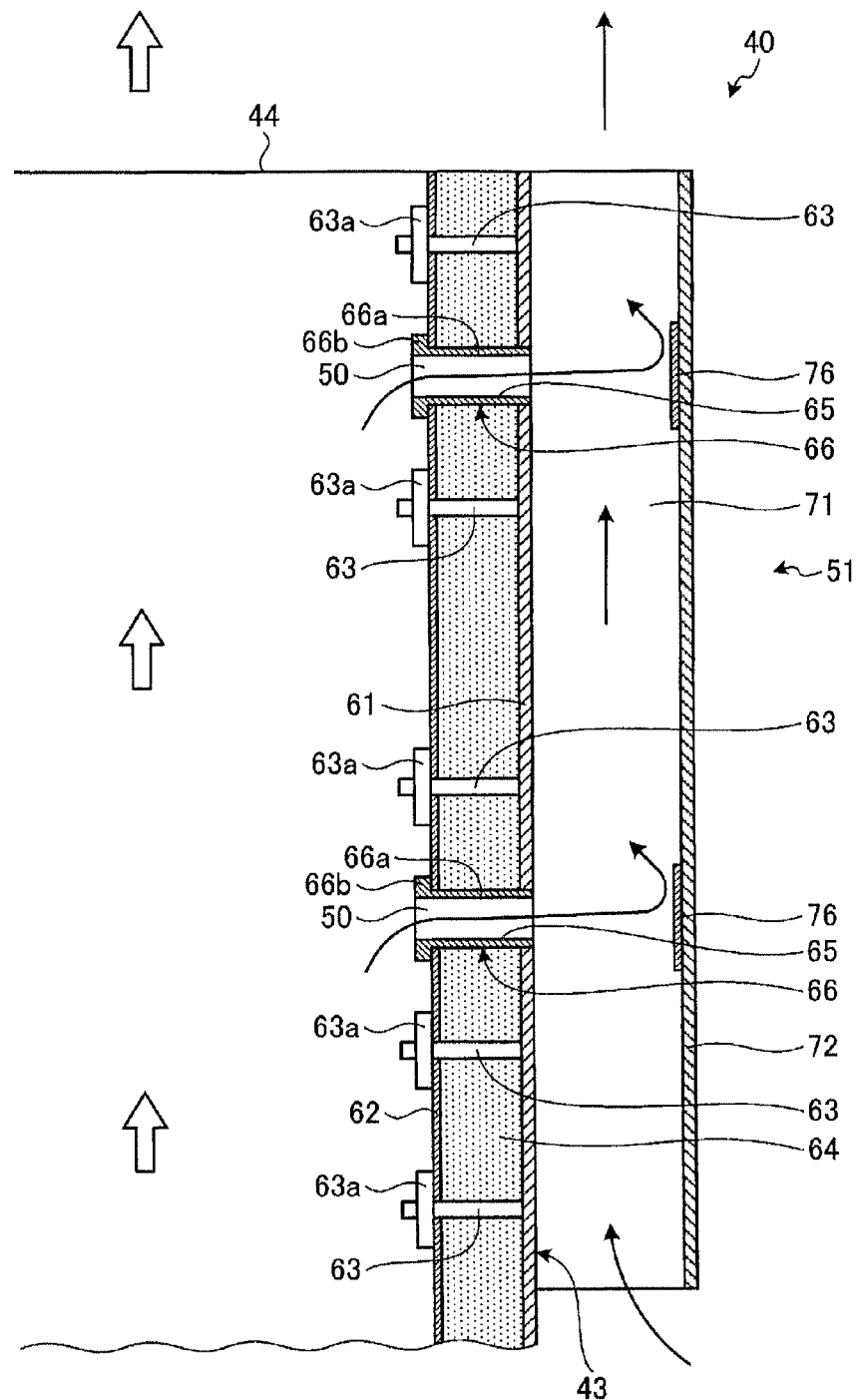
FIG. 12 is a cross-sectional view of the open end of an exhaust flue according to a seventh embodiment.

FIG. 12 is a cross-sectional view of the open end of an exhaust flue according to a seventh embodiment. In the following description, constituent elements identical to those of the embodiment described above are identically numbered, and redundant description thereof will be omitted.

As illustrated in FIG. 12, the exhaust flue 40 according to the seventh embodiment is provided with the outer sheath 72 covering the outer circumference of the open end multi-hole area 51 with the gap 71 formed therebetween. Thermal insulation 76 is provided on the inner surface of the outer sheath 72 facing the holes 50. Although not illustrated in the drawings, thermal insulation is preferably also provided on the supporting members supporting the outer sheath 72.

Some of the high-temperature exhaust gas rising through the open end multi-hole area 51 of the exhaust chimney body 43 passes through the holes 50 and is discharged into the gap 71, and then rises through the gap 71. At this point, exhaust gas passing through the holes 50 of the open end multi-hole area 51 into the gap 71 collides with the thermal insulation 76 and rises upward. Meanwhile, outside air is taken in from the lower end of the gap 71 and mixes with the rising exhaust gas. Having been cooled by the outside air, the exhaust gas is discharged out the upper end of the gap 71.

As described above, the exhaust flue 40 according to the seventh embodiment is provided with the outer sheath 72 that covers the outer circumference of the open end multi-hole area 51 of the exhaust chimney body 43 with the gap 71 formed therebetween, and thermal insulation 76 is provided on an inner surface of the outer sheath 72 facing the holes 50. In this structure, exhaust gas discharged through the holes 50 in the open end multi-hole area 51 into the gap 71 collide with the thermal insulation 76 before rising upward through the gap 71, allowing increases in the temperature of the outer wall 61 to be suppressed.

Eighth Embodiment

Figure 13:
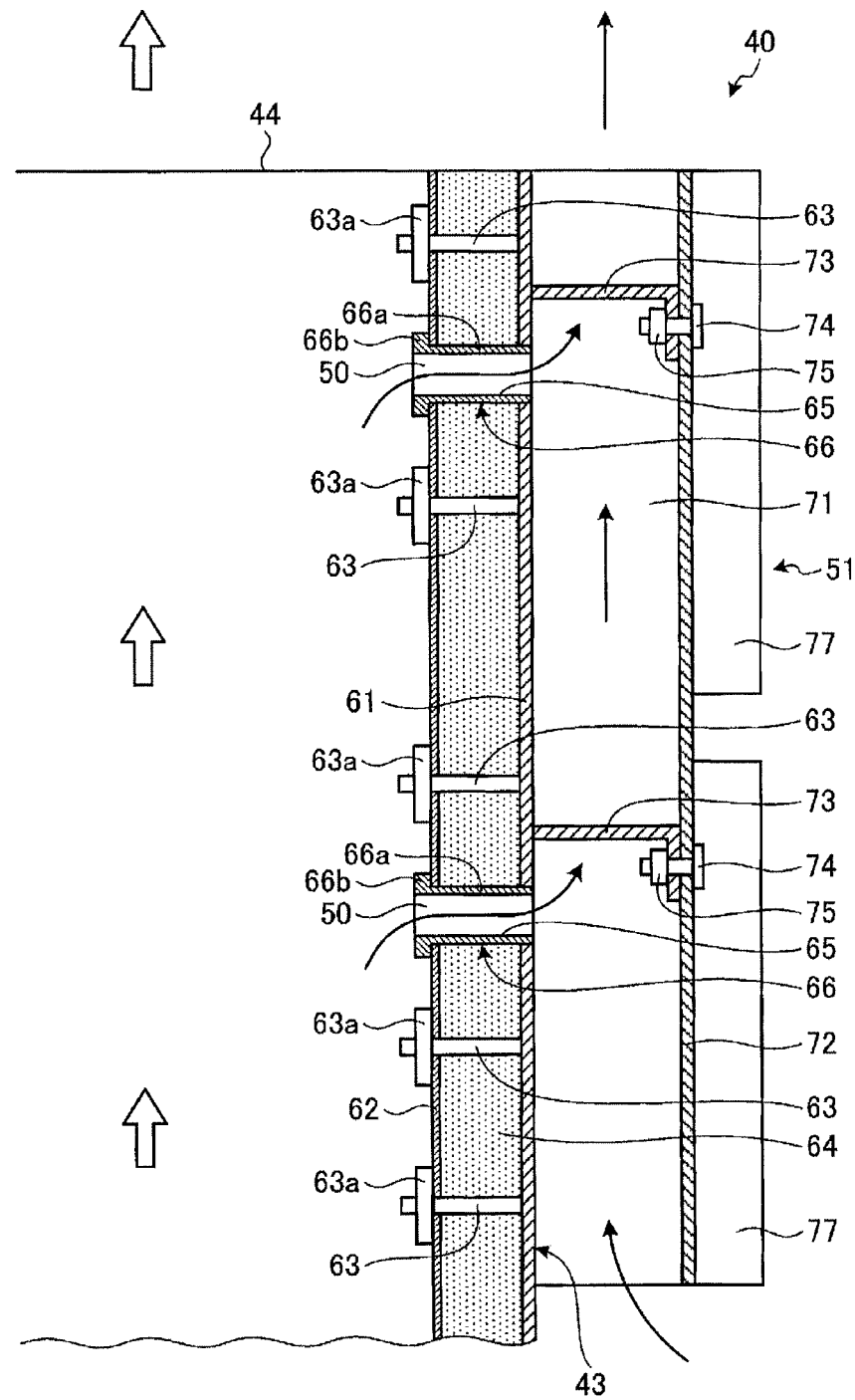
FIG. 13 is a cross-sectional view of the open end of an exhaust flue according to an eighth embodiment.

FIG. 13 is a cross-sectional view of the open end of an exhaust flue according to an eighth embodiment. In the following description, constituent elements identical to those of the embodiment described above are identically numbered, and redundant description thereof will be omitted.

As illustrated in FIG. 13, the exhaust flue 40 according to the eighth embodiment is provided with the outer sheath 72 covering the outer circumference of the open end multi-hole area 51 with the gap 71 formed therebetween. Ribs 77 are provided on the outer surface of the outer sheath 72. The ribs 77 are anchored orthogonally with respect to the outer surface of the outer sheath 72, and a plurality thereof is disposed at equal intervals in the circumferential direction. Here, the ribs 77 are divided into multiple sections in the vertical direction, but the ribs may also be single pieces. In addition, the ribs 77 in this case are anchored to the outer surface of the outer sheath 72 in the vertical direction, but it is also possible to anchor a plurality of ribs in the circumferential direction disposed at equal intervals in the vertical direction.

As described above, the exhaust flue 40 according to the eighth embodiment is provided with the outer sheath 72 that covers the outer circumference of the open end multi-hole area 51 of the exhaust chimney body 43 with the gap 71 formed therebetween, and ribs 77 are provided on the outer surface of the outer sheath 72. In this structure, the dimensions or shapes of the ribs 77 can be altered in order to achieve optimal acoustic impedance at the open end 44.

Ninth Embodiment

Figure 14:
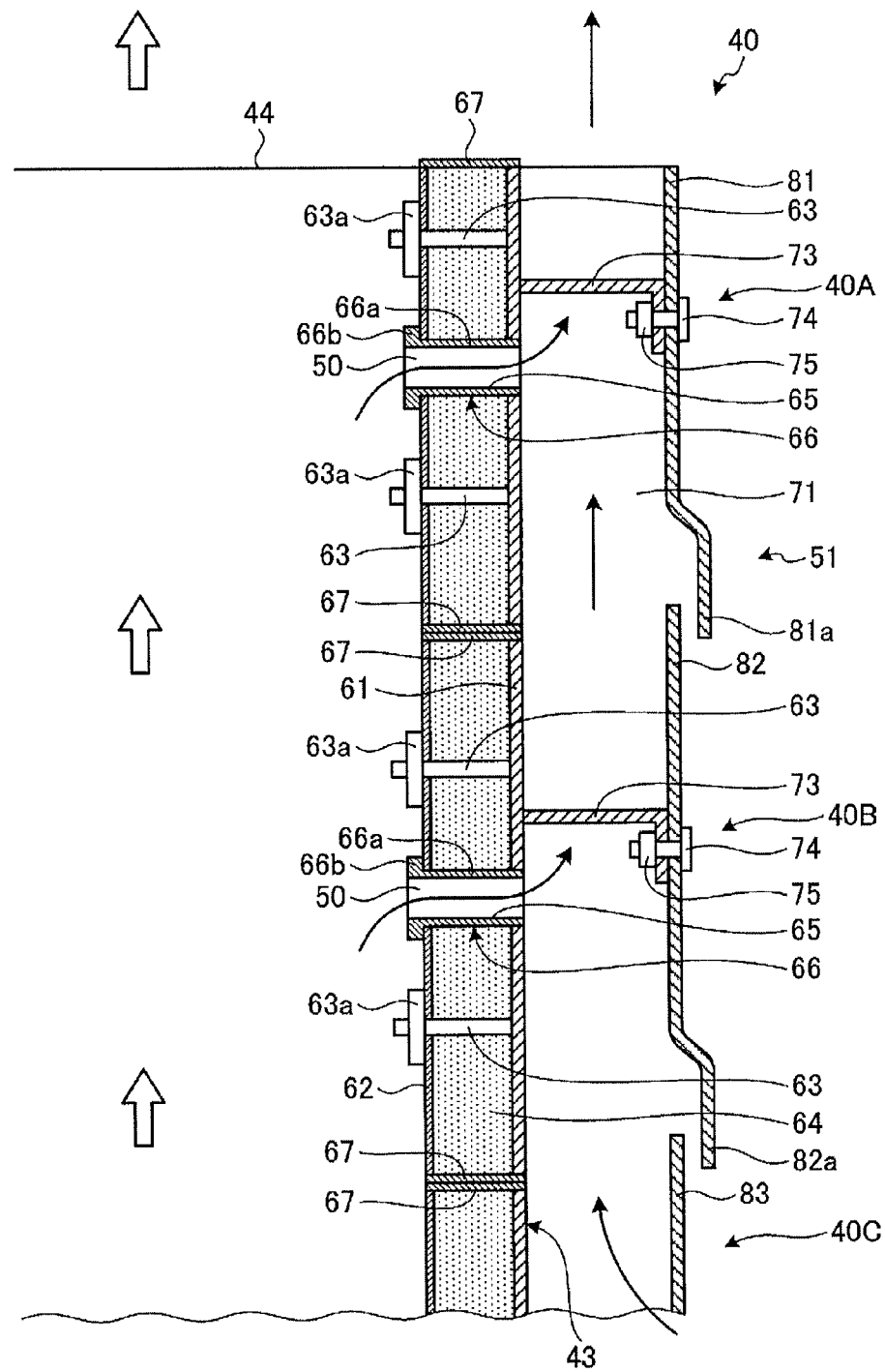
FIG. 14 is a cross-sectional view of the open end of an exhaust flue according to a ninth embodiment.

FIG. 14 is a cross-sectional view of the open end of an exhaust flue according to a ninth embodiment. In the following description, constituent elements identical to those of the embodiment described above are identically numbered, and redundant description thereof will be omitted.

As illustrated in FIG. 14, the exhaust flue 40 according to the ninth embodiment is constituted by a plurality of tubular multi-hole structure blocks 40A, 40B, 40C of a predetermined lengths linked together. Each of the multi-hole structure blocks 40A, 40B, 40C is constituted by the cylindrical outer wall 61, the inner wall 62 made up of a plurality of insulating panels, a plurality of the linking members 63 linking the outer wall 61 and the inner wall 62, thermal insulation 64 disposed between the outer wall and the inner wall, and cap members 67 that discharge the thermal insulation 64 from falling out of the upper and lower ends of the outer wall 61 and the inner wall 62. The cap members 67 of the multi-hole structure blocks 40A, 40B, 40C contact each other, and the inner and outer circumferential surfaces thereof are connected via welding.

The multi-hole structure blocks 40A, 40B, 40C are provided with outer sheaths 81, 82, 83 that cover the outer circumferences thereof with the gap 71 formed therebetween. Wide-diameter sections 81*a*, 82*a* are formed on the lower ends of the outer sheaths 81, 82, and are formed so as to overlap with the upper ends of the respective outer sheaths 82, 83. The outer sheaths 81, 82, 83 are supported by supporting members 73.

As described above, the exhaust flue 40 according to the ninth embodiment is constituted by a plurality of tubular multi-hole structure blocks 40A, 40B, 40C of a predetermined lengths linked together. In this structure, a plurality of multi-hole structure blocks 40A, 40B, 40C can be manufactured, for example, at a factory and transported to a site, where the plurality of multi-hole structure blocks 40A, 40B, 40C is linked together to create an exhaust flue, thereby allowing the manufacturing process to be simplified and construction costs to be reduced.

Forming the exhaust flue 40 from a plurality of multi-hole structure blocks 40A, 40B, 40C allows, for example, the positions or size of the openings in the outer sheaths 81, 82, 83 to be altered in order to achieve optimal acoustic impedance at the open end 44.

Tenth Embodiment

Figure 15:
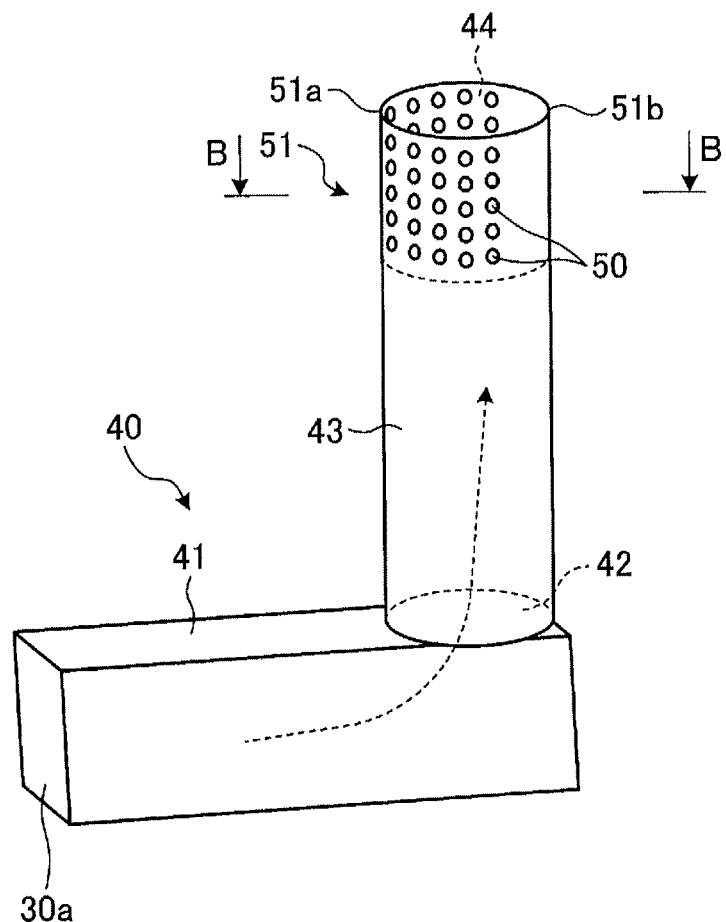
FIG. 15 is a schematic perspective view of an exhaust flue according to a tenth embodiment.
Figure 16:
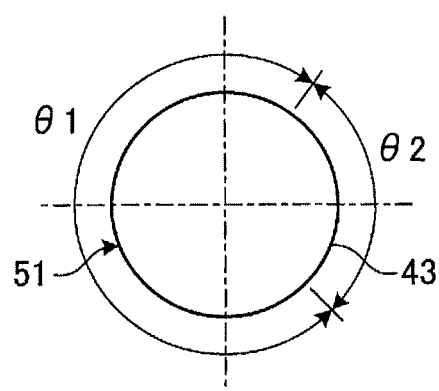
FIG. 16 is a partial cross-sectional view along B-B in FIG. 15.

FIG. 15 is a schematic perspective view of an exhaust flue according to a tenth embodiment, and FIG. 16 is a partial cross-sectional view along section B-B in FIG. 15. In the following description, constituent elements identical to those of the embodiment described above are identically numbered, and redundant description thereof will be omitted.

As illustrated in FIGS. 15 and 16, the exhaust flue 40 of the tenth embodiment is provided with the open end multi-hole area 51 in which a plurality of holes 50 is formed around at least a portion of the total circumference of the open end 44 of the exhaust chimney body 43. Specifically, the open end multi-hole area 51 is provided at the open end 44 of the exhaust chimney body 43 on an inner side thereof with respect to a direction in which the exhaust chimney body 43 bends.

The exhaust chimney body 43 of the exhaust flue 40 is connected to the exhaust duct body 41 bent at substantially a right angle, and the open end multi-hole area 51 is provided over a portion of the open end 44. Exhaust gas bends in substantially a right angle from the exhaust duct body 41 and flows through the exhaust chimney body 43, with the holes 50 being formed in an open end 44a side of the inner side of the exhaust chimney body 43 with respect to the direction in which the same bends, and not being formed in an open end 44b side. For example, the holes 50 are formed within an angular area θ1 on the open end 44a side of the open end multi-hole area 51 of the exhaust chimney body 43, and are not formed within an angular area θ2 on the open end 44b side thereof.

As described above, the exhaust flue 40 according to the tenth embodiment is provided with the open end multi-hole area 51 around at least a portion of the total circumference of the open end 44 of the exhaust chimney body 43, such as in the open end 44 on an inner side of the exhaust chimney body 43 with respect to the direction in which the same bends. This structure allows the amount of exhaust gas discharged from the open end multi-hole area 51 to be reduced.

In the tenth embodiment, the open end multi-hole area 51 is provided on the inner side of the exhaust chimney body 43 with respect to the direction in which the same bends; however, the open end multi-hole area 51 is not limited to this position, and may be set as appropriate according to the shape of the exhaust flue 40.

The various embodiments of exhaust flues described above are examples of cases in which the present invention is applied to a gas turbine; however, the present invention is not limited to gas turbines, but can be applied to any sort of facility that releases exhaust gas.

REFERENCE SIGNS LIST

11 Compressor
12 Combustor
13 Turbine
20 Air intake duct
21 Compressor housing
30 Exhaust chamber
30a Connection opening
31 Exhaust diffuser
40 Exhaust flue
41 Exhaust duct body
42 Communication hole
43 Exhaust chimney body
44 Open end
50 Hole
51 Open end multi-hole area
52 Second multi-hole area
53 Third multi-hole area
54 Outer sheath
55 Gap
56 Reinforcing rib
61 Outer wall
62 Inner wall
63 Linking member
64 Thermal insulation
66 Cylindrical member
71 Gap
72 Outer sheath
76 Thermal insulation
77 Rib
81, 82, 83 Outer sheath
N11, N21, N22, N31, N32, N33 Node

The invention claimed is:

1. An exhaust flue comprising:
an exhaust chimney body defining a passage for discharging exhaust gas; and
an open end multi-hole area in which holes are defined around a total circumference of an open end of the exhaust chimney body,
wherein:
the exhaust chimney body includes an outer wall, an inner wall, a linking member configured to link the outer wall and the inner wall, and thermal insulation between the outer wall and the inner wall,
each of the holes is defined by a cylindrical member that passes through the outer wall, the thermal insulation, and the inner wall, and
the cylindrical member includes a flange which is welded.

2. The exhaust flue according to claim 1, further comprising another multi-hole area in which holes are defined at a position different from a position of the open end multi-hole area of the exhaust chimney body.

3. The exhaust flue according to claim 1, further comprising an outer sheath that covers an outer periphery of the open end multi-hole area with a gap therebetween.

4. The exhaust flue according to claim 2, wherein the exhaust chimney body includes reinforcing ribs between adjacent holes in the open end multi-hole area or adjacent holes in the other multi-hole area.

5. The exhaust flue according to claim 3, wherein a lower end and an upper end of the gap between the open end multi-hole area and the outer sheath are open to the outside.

6. The exhaust flue according to claim 3, wherein thermal insulation is included on an inner surface of the outer sheath facing the holes.

7. The exhaust flue according to claim 3, wherein ribs are included on an outer surface of the outer sheath.

8. The exhaust flue according to claim 1, wherein the exhaust flue is defined by tubular multi-hole structure blocks of predetermined lengths linked together.

9. An exhaust flue comprising:
an exhaust chimney body defining a passage for discharging exhaust gas; and
an open end multi-hole area in which holes are defined around at least a portion of a total circumference of an open end of the exhaust chimney body,
wherein:
the exhaust chimney body includes an outer wall, an inner wall, a linking member configured to link the outer wall and the inner wall, and thermal insulation between the outer wall and the inner wall,
each of the holes is defined by a cylindrical member that passes through the outer wall, the thermal insulation, and the inner wall, and
the cylindrical member includes a flange which is welded.

10. The exhaust flue according to claim 9, wherein the open end multi-hole area is positioned at the open end of the exhaust chimney body on an inner side thereof with respect to a direction in which the exhaust chimney body bends.

* * * * *